United States Patent
Tsuchida

Patent Number: 5,085,505
Date of Patent: Feb. 4, 1992

[54] OVERHEAD PROJECTOR
[75] Inventor: Michiro Tsuchida, Yokohama, Japan
[73] Assignee: Nipox Kabushiki Kaisha, Japan
[21] Appl. No.: 628,885
[22] Filed: Dec. 18, 1990

[30] Foreign Application Priority Data
Dec. 28, 1989 [JP] Japan ............................ 1-150068

[51] Int. Cl.$^5$ .............................................. G03B 21/28
[52] U.S. Cl. .............................. 353/98; 353/94; 353/63
[58] Field of Search ................ 353/98, 94, 99, 63, 353/64, 122, 121, DIG. 3, 66, 65, DIG. 4, 48, 89

[56] References Cited
U.S. PATENT DOCUMENTS

| | | | |
|---|---|---|---|
| 3,900,253 | 8/1975 | Astero | 353/98 |
| 4,565,430 | 1/1986 | Grunwald | 353/94 |
| 4,922,079 | 11/1975 | Astero | 353/63 |

FOREIGN PATENT DOCUMENTS

| | | | |
|---|---|---|---|
| 0124422 | 10/1931 | Austria | 353/63 |
| 0129963 | 10/1932 | Austria | 353/63 |
| 2929328 | 1/1981 | Fed. Rep. of Germany | 353/94 |
| 2581771 | 11/1986 | France | 353/98 |

Primary Examiner—William A. Cuchlinski, Jr.
Assistant Examiner—William C. Dawling
Attorney, Agent, or Firm—Dykema Gossett

[57] ABSTRACT

An overhead projector comprises two light sources, a first reflection mirror that reflects a light from an illuminating light source of said light sources toward a reflection type light collection lens and a projection lens that projects a light reflected from said light collection lens onto a screen via a second reflection mirror, while said two light sources, said first reflection mirror and said projection lens being arranged parallel and housed together in a longitudinal direction of an overhead cabinet, wherein the light axes of said two light sources are directed toward a center portion of a mirror surface of the first reflection mirror, said two light sources are mounted parallel laterally in said overhead cabinet, and said first reflection mirror is mounted in a manner that said first reflection mirror is rotatable around said center portion of the mirror surface.

1 Claim, 1 Drawing Sheet

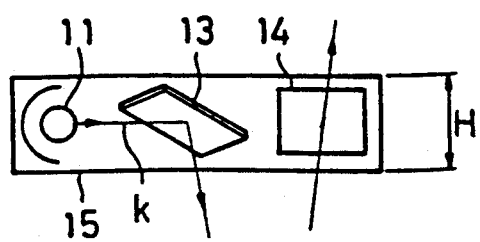
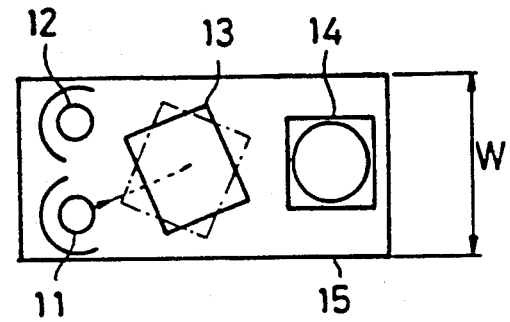
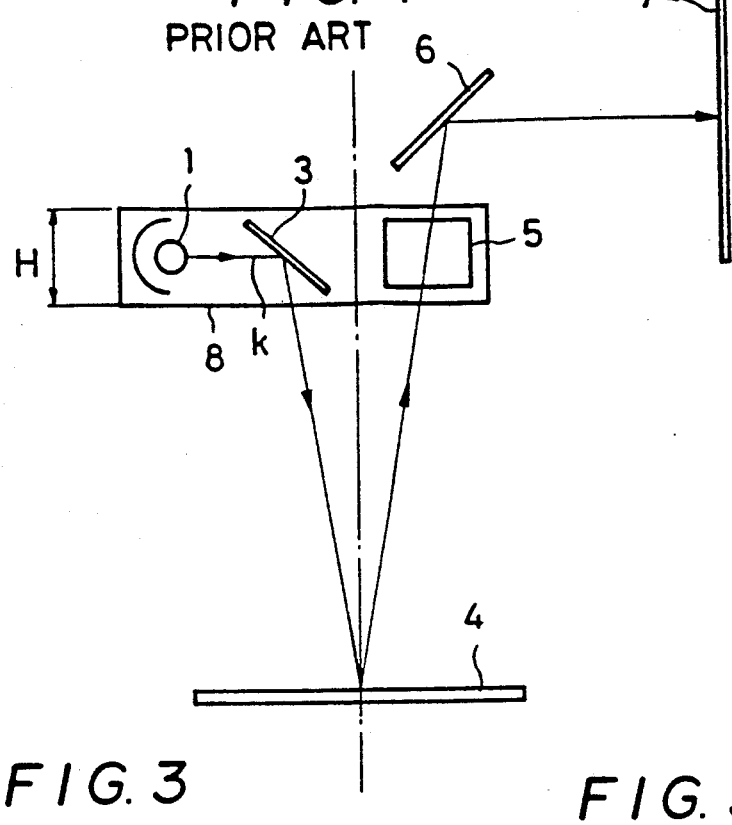
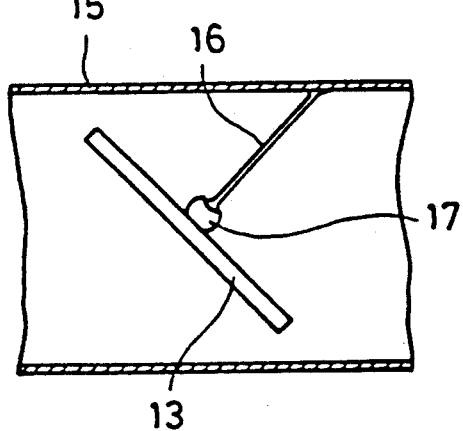
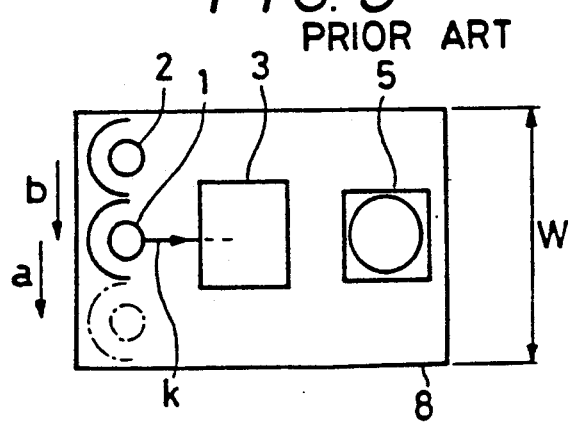

OVERHEAD PROJECTOR

BACKGROUND OF THE INVENTION

1. Field of the Invention

The present invention relates to an overhead projector comprising light sources, a reflection mirror that reflects a light from one of said light sources toward a reflection type light collecting lens and a projection lens that projects a light from the light collection lens, while housing them in a cabinet.

2. Description of the Prior Art

Conventional overhead projectors in this type of structure, as known in the prior art, are shown in FIGS. 4 and 5. In FIGS. 4 and 5, numerals represent various devices as follows: 1 and 2 for light sources, 3 for a first reflection mirror that reflects a light of said light source 1 and 2 toward a light collection lens 4 of a reflection type and 5 for a projection lens that projects a light of the light source 1 or 2 reflected by the light collection lens 4 onto a screen 7 via a second reflection mirror 6. Said light sources 1 and 2, the first reflection mirror 3 and the projection lens 5 are housed in a flat, rectangular parallelepiped overhead cabinet (hereinafter referred to as a cabinet) 8.

Or explicitly, one 1 of the 2 light sources 1, 2 is mounted to direct its light axis k toward a center portion of a mirror surface of the first reflection mirror. The other light source 2 is mounted parallel to and immediately in the side of the light source 1.

The light source 1 is constructed slidably aside (direction a) toward a position shown by a chain line, for escaping. The light source 2 is constructed so that it can move to the position of the light source 1 after it has escaped, by sliding it aside (direction b) in the same way.

In addition, the light source 1, the first reflection mirror 3 and the projection lens 5 are mounted in a row on the center lines in the lateral and height directions of the cabinet 8.

Since such a composition as described above is employed, if a light source 1 burns during the operation of the projector, it is possible to move the light source 1 to the position of a chain line while moving the other light source 2 to that place where the light source 1 was.

However, with a conventional overhead projector known in the prior art, light source 1, 2 are arranged parallel in the direction w in the cabinet 8 while making a light source 1 escape into the position of the chain line and moving the other light source 2 to the place where the light source 1 was located. Therefore, there are the following problems :

(1) The width W of the cabinet 8 must be as large as three light sources 1 are arranged laterally in a row. Consequently, a larger cabinet 8 is required and cannot satisfy the requirement for a more compact structure.

(2) When a light source 1 burns and must be replaced with the other light source 2, it is required to move them to the position of a chain line and the place that was occupied by the light source 1, respectively in manual operation. However, the light source 1 is heated up so high as the operator cannot replace it immediately. Therefore, the use of the projector has to be interrupted until light sources 1, 2 are cooled down.

SUMMARY OF THE INVENTION

The present invention has been accomplished to solve these problems associated with conventional projectors known in the prior art. One object of the present invention is to provide such an overhead projector as, when a light source burns, the time to interrupt the use of the projector is reduced while making the size of the cabinet smaller.

An overhead projector provided by the present invention comprises 2 light sources, a first reflection mirror that reflects a light from an illuminating light source of said light sources toward a reflection type light collection lens and a projection lens that projects a light reflected from said light collection lens onto a screen via a second reflection mirror, while said 2 light sources, said first reflection mirror and said projection lens being arranged parallel and housed together in a longitudinal direction of an overhead cabinet, wherein the light axes of said 2 light sources are directed toward a center portion of a mirror surface of the first reflection mirror, said 2 light sources are mounted parallel laterally in said overhead cabinet, and said first reflection mirror is mounted in such a manner that said first reflection mirror is rotatable around said center portion of the mirror surface.

When an illuminating light source burns during the use of said projector, the other light source is turned ON using a switch, etc. while directing the first reflection mirror to the light axis, thereby the projector is immediately available to use again.

In addition, said 2 light sources are mounted parallel in the lateral direction of the overhead cabinet. Therefore, compared to a conventional projector known in the prior art, the width of the cabinet is made narrower by the size of a light source.

BRIEF DESCRIPTION OF THE DRAWINGS

FIG. 1 is a side elevation of an overhead cabinet of the embodiment of the present invention; FIG. 2 is a cross section of the same; FIG. 3 is an enlarged view of the first reflection mirror shown in FIG. 1; FIG. 4 is a side elevation of a conventional overhead projector known in the prior art; and FIG. 5 is a plan view of the overhead cabinet shown in FIG. 4.

DETAILED DESCRIPTION OF THE PREFERRED EMBODIMENT

An embodiment of the present invention is detailed referring to FIGS. 1 through 3.

FIG. 1 is a side elevation of an overhead cabinet portion (corresponding to a conventional cabinet 8) of an embodiment of the overhead projector according to the present invention; FIG. 2 is a cross section of the same; and FIG. 3 is an enlarged view of an important portion shown in FIGS. 1 and 2. The composition of other portions is the same as that of FIG. 4. Therefore, no more illustration and description are given herein. However, FIG. 4 is also referred to describe the embodiment of the present invention.

Referring to FIGS. 1 through 4, numerals 11, 12 and 13 represent light sources (halogen lamps) and a first reflection mirror, respectively. In this equipment a light of an illuminating light source 11 or 12 is reflected by the first reflection mirror toward a reflection type light collecting lens 4. Numeral 14 represents a projection lens. This lens projects a light reflected by the light collection lens 4 onto a screen 7 via a second reflection mirror 6.

Said light sources 11 and 12, first reflection mirror 13 and said projection lens 14 are housed in a flat and rectangular parallelepiped overhead cabinet (briefly, a cabinet) 15.

In detail, said 2 light sources 11 and 12 are mounted in such a manner that their light axes k are directed toward a center portion of a mirror surface of the first reflection mirror 13, parallel and lateral to the cabinet 15. Both light sources 11 and 12 are turned ON and OFF using switches, though not illustrated herein, special for each light source. The first reflection mirror 13 is mounted on an arm 16 fixed in the cabinet 15, via a universal joint 15 as shown in FIG. 3. Consequently, it is rotatable with a center axis of a mirror surface. Furthermore, a pair of the light sources 11 and 12, first reflection mirror 13 and the projection lens 14 are arranged in a row within the center lines in the lateral and height directions of the cabinet 15.

Detailed operation of the composition above is described in the following:

(1) When an illuminating light source 11 burns during the use of the projector, the switch for the other light source 12 is turned ON to illuminate it while directing the first reflection mirror 13 in alignment to the light axis k of the light source 12 making a reflected light k pass through the center of the light collection lens 5. Thereby, the projector becomes operable again.

As described above, with the projector of the embodiment, it is possible to switch a burned light source 11 immediately to the other one 12 only by turning ON the switch. Therefore, it becomes possible to reduce the time of the interruption of operating the projector.

(2) Said 2 light sources 11 and 12 are mounted parallel in the lateral W direction of the cabinet 15 and are illuminated using respective switches. Consequently, a minimum required width W of the cabinet 15 is only for 2 pieces of a light source 1 or 2. As a result, it is possible that the width W of the cabinet 15 is smaller than a conventional size by the dimension corresponding to a light source while making the cabinet 15 smaller.

As described above, according to the present invention, 2 light sources are mounted parallel and laterally to the cabinet while making each light source illuminatable individually. In addition, the direction of the first reflection mirror is made variable according to the light axis of an illuminating light source. Therefore, the following effects are obtained.

(1) When an illuminating light source burns during the use of the projector, it is possible to light up the other light source while directing the first reflection mirror in alignment with the optical axis. Consequently, the time of interrupting the use of the projector is significantly reduced.

(2) Two light sources are mounted parallel in the cross direction of the cabinet. Therefore, the width of the cabinet is made smaller than that of a conventional cabinet known in the prior art, by the size of a light source. Accordingly, the cabinet is made more compact.

What is claimed is:

1. An overhead projector comprising two light sources, a first reflection mirror that reflects a light from an illuminating light source of said light sources toward a reflection type light collection lens and a projection lens that projects a light reflected from said light collection lens onto a screen via a second reflection mirror, while said two light sources, said first reflection mirror and said projection lens being arranged parallel and housed together in a longitudinal direction of an overhead cabinet, wherein the light axes of said two light sources are directed toward a center portion of a mirror surface of the first reflection mirror, said two light sources are mounted parallel laterally in said overhead cabinet, and said first reflection mirror is mounted in such a manner that said first reflection mirror is rotatable around said center portion of the mirror surface.

* * * * *